United States Patent [19]
Schacht

[11] 3,878,845
[45] Apr. 22, 1975

[54] METHOD FOR SEXUAL RESTRAINT OF A BULL

[76] Inventor: Lewis C. Schacht, 5009 Vernon, Tallahassee, Fla. 32301

[22] Filed: Jan. 21, 1974

[21] Appl. No.: 435,265

[52] U.S. Cl. ............................... 128/138; 119/145
[51] Int. Cl. .............................................. A61t 5/37
[58] Field of Search ............. 128/138 R, 79, 138 A; 119/143, 145, 96

[56] References Cited
UNITED STATES PATENTS
863,291   8/1907   Leech .............................. 119/145
1,046,935  12/1912  Anderson .......................... 119/145
2,625,134  1/1953   Massey ............................ 119/145

Primary Examiner—Richard A. Gaudet
Assistant Examiner—G. F. Dunne
Attorney, Agent, or Firm—Cushman, Darby & Cushman

[57] ABSTRACT

A method and apparatus for sexual restraint of a bull. A flanged tube is inserted in the bull's sheath and is secured in place by a pin passing through the tube and through aligned incisions in the opposite sides of the sheath. The tube blocks egress of the bull's penis from the sheath and permits a bull of low quality to be used for detecting estrus in a cow without resulting in impregnation of the cow by the low quality bull.

2 Claims, 3 Drawing Figures

PATENTED APR 22 1975　　　　　　　　　　　3,878,845
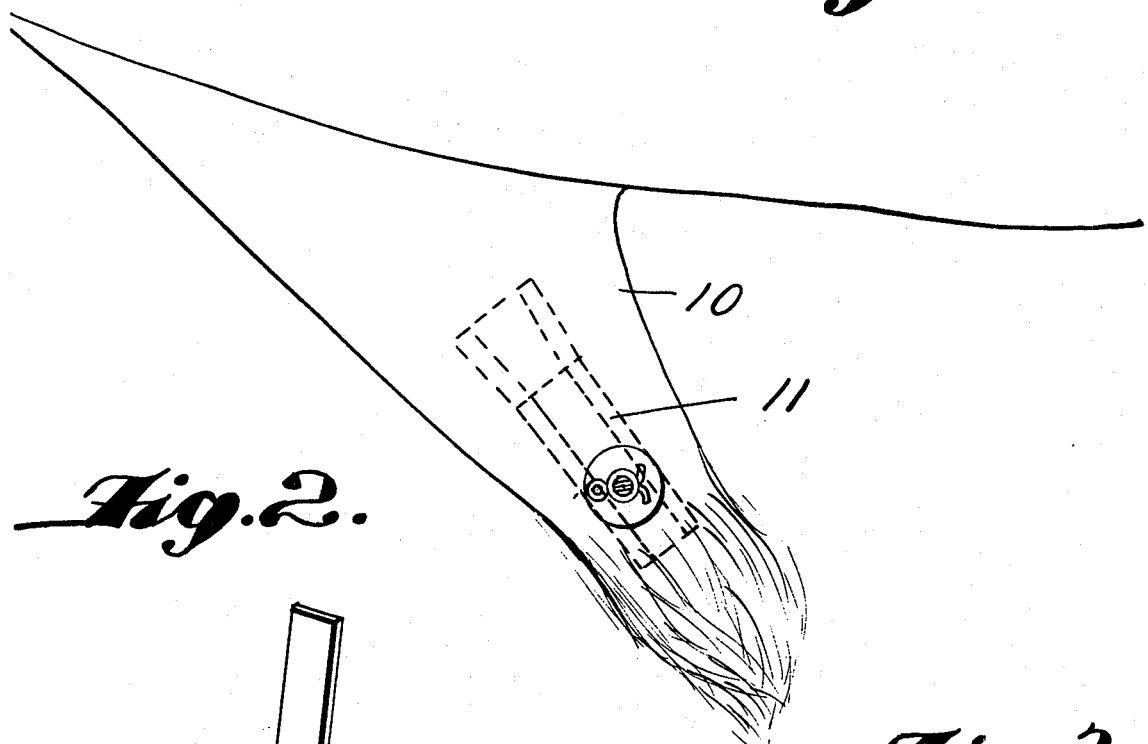
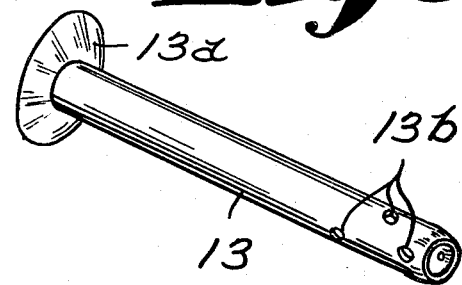
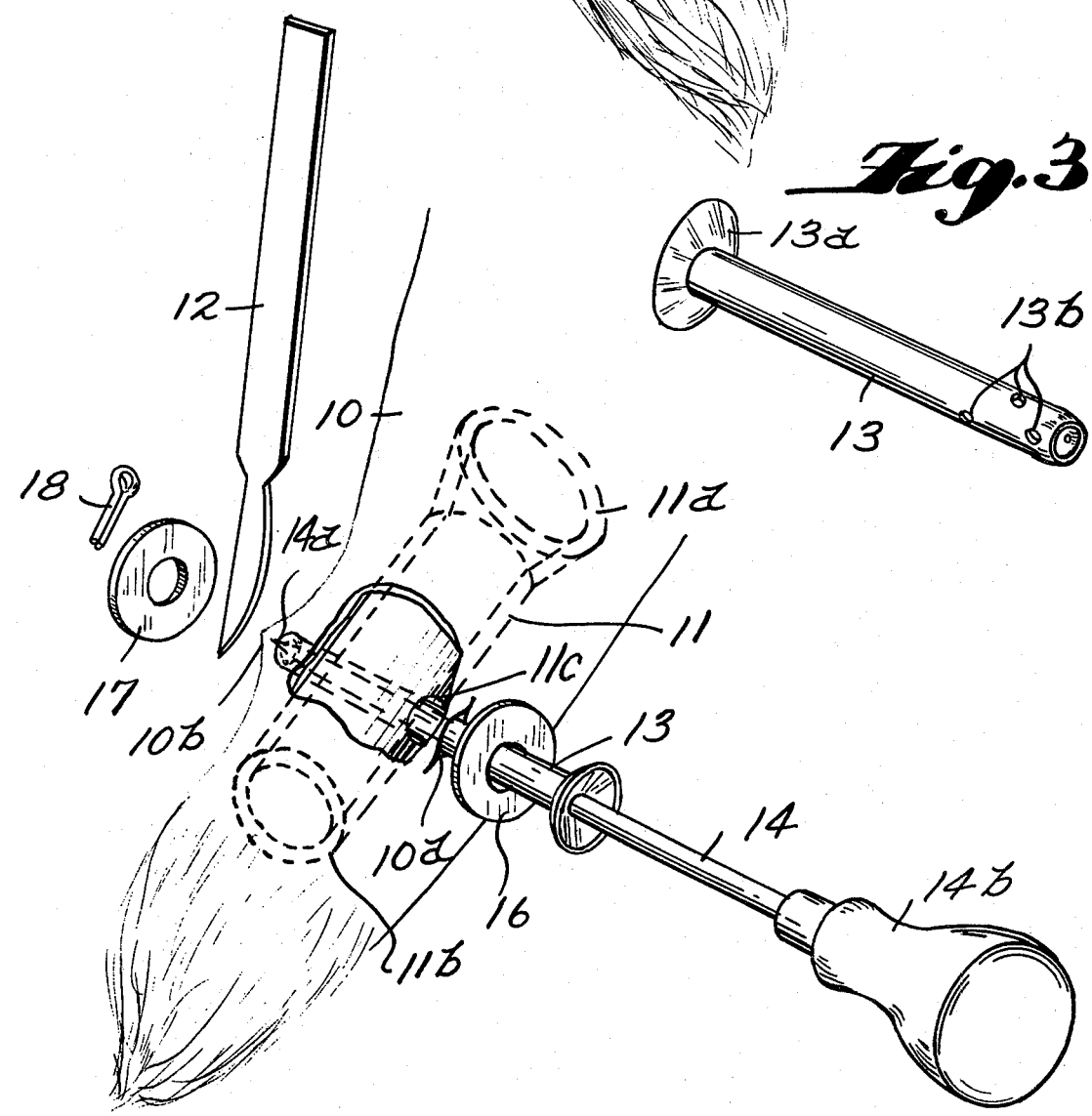

METHOD FOR SEXUAL RESTRAINT OF A BULL

BACKGROUND OF THE INVENTION

The trend in cattle breeding in recent years has been an increasing shift to the use of artificial insemination techniques. Through artificial insemination techniques cows can be impregnated by high quality prize bulls located virtually anywhere, without the necessity of having to physically bring the two animals together. This is obviously a saving of time and expense and facilitates breeding for selected, high quality characteristics. However, in order to artificially inseminate a cow, it is necessary to be able to recognize estrus (heat) in the cow so that the cow is artificially inseminated at a time when it can conceive. Mechanical devices have been proposed for this purpose but are inherently cumbersome and unreliable. It has also been proposed to utilize a bull which is naturally sterile or which has been surgically sterilized for detecting estrus. In this technique the sterile bull has access to one or more cows. The bull and cows are then observed and the cow which the bull mounts is thereby identified as being in heat. Surgical sterilization of a bull, however, is somewhat complex and the bull often has an adverse reaction. What is desirable, therefore, is a technique by which a low quality bull can be utilized for detecting estrus in a cow without impregnating the cow and without requiring that the bull be surgically sterilized.

OBJECTS AND SUMMARY OF THE INVENTION

Accordingly, it is an object of this invention to provide a method and apparatus for permitting a low quality bull to be used for detecting estrus in a cow without impregnating the cow.

It is a more specific object of this invention to provide such a method and apparatus which does not require sterilization of the bull.

It is a still more specific object of one embodiment of apparatus in accordance with this invention to provide a sexual restraint for a bull.

Briefly, in accordance with one aspect of the invention, a flanged tube is inserted in the bull's sheath. The flanged tube has a transverse opening therein and incisions are made in opposite sides of the bull's sheath corresponding to the openings. A pin is inserted through one opening in the sheath, passing through the flanged tube and out the other opening in the sheath and the pin is secured in place.

BRIEF DESCRIPTION OF THE DRAWINGS

FIG. 1 is a side view of a bull's sheath showing a blocking device in accordance with this invention installed in the sheath.

FIG. 2 is an exploded view illustrating the manner in which a pin is passed through the blocking tube in the bull's sheath and installed thereon.

FIG. 3 is a detailed view of the pin being installed in FIG. 2.

DESCRIPTION OF THE PREFERRED EMBODIMENT

Turning now to a consideration of the drawings, there is illustrated the blocking apparatus of this invention in place in the sheath of a bull and there is also schematically illustrated the manner in which the blocking device is installed. Firstly, a tubular blocking member 11 is provided which may be made of plastic, for example. In accordance with one embodiment of the invention, the tubular member 11 has a flanged end 11a. The blocking member 11 is inserted into the bull's sheath 10 with the flanged end 11a being inserted first, and inserted into the bull's sheath such that the opposite end 11b of the blocking member is 1 to 2 inches inward from the entrance to the bull's sheath 10. Placement and spacing of the tubular member 11 in the bull's sheath 10 will, of course, vary depending upon the physical makeup of the bull's sheath.

In accordance with the invention the blocking member 11 is provided with a transverse opening 11c formed therein which extends all the way through the tubular blocking member 11. After the tubular blocking member 11 has been inserted into the bull's sheath as described above, the next step is manually feeling one side of the bull's sheath to locate one side of the opening or aperture 11c of the tube 11 from the outside of the sheath. When the opening 11c is located, an incision is made to the wall of the sheath by a knife means such as a sterile scapel 12. Thus there results an incision 10a in one side of the bull's sheath corresponding to the underlying transverse opening 11c which extends through the tubular member 11.

In accordance with this one preferred embodiment of the invention, a pin 13 is provided which has one end formed with a flange 13a thereon and has its other end being provided with openings such as those illustrated by reference numeral 13b through which a cotter pin may be passed. Further, in accordance with this one embodiment of one aspect of the invention, an installing instrument 14 is provided for installing the pin 13. The installing instrument 14 comprises a pointed rod having a pointed end 14a and having a handle portion 14b. The installing instrument 14 is inserted into the pin 13 which is hollow with the pointed end 14a of the installing instrument 14 being inserted into the hollow pin 13 through its flanged end 13a first. A washer 16 is then placed over the pin 13 in the manner shown in FIG. 2. The pointed end 14a of the installing instrument 14 with the pin 13 retained thereon as well as the washer 16 retained on the pin 13, is then inserted through the first incision 10a made in the side of the bull's sheath and through the transverse opening 11c in the tubular blocking member 11. As illustrated in FIG. 2, after the pointed end 14a of installing instrument 14 passes all the way through the transverse opening 11c in tubular member 11, it will distend the sidewall of the bull's sheath at portion 10b thereof which is opposite the first incision 10a made in the sidewall of the bull's sheath.

Next, a second incision is made in the sidewall of the bull's sheath utilizing means such as sterile scapel 12 with the incision being made at the distended portion 10b which is distended by the pointed end 14a of installing instrument 14. As the incision is made at the portion 10b of the sidewall of the bull's sheath, the pointed end 14a and the end of the pin 13 are pushed out through this second incision in the wall of the bull's sheath. The installing instrument can then be withdrawn. An additional washer 17 is then placed over the end of the pin 13 extending out at the portion of the bull's sheath 10b where the second incision is made and a cotter pin 18 is inserted through one of the cotter pin openings 13b provided in the pin 13. The ends of the cotter pin 18 are then spread in a normal manner to retain the pin 13 in an assembled relationship extending through the first incision 10a in the sidewall of the bull's sheath and through the transverse opening 11c in the blocking member and out a second incision in the sidewall of the bull's sheath at portion 10b thereof. The tubular blocking member 11 is thus held in place inside the bull's sheath and comprises a sexual restraint for the bull for preventing egress of the bull's penis from the sheath 10.

In accordance with preferred embodiments of the invention, the tubular member 11 is made of plastic and the pin 13 can be made of metal or is preferably made of plastic or plastic-coated metal. The reason for this is that less adverse reactions occur in an animal's body to the presence of foreign plastic materials than to the presence of foreign metal materials. Further, as illustrated in FIG. 3, the pin 13 has a plurality of holes 13b formed therein so as to provide an adjustment feature so that the restraining device in accordance with this invention is adaptable for animals of various sizes and configurations. Also, if desired, the washers 16 and 17 could be coated with a reflecting material to facilitate location and identification of a bull having the restraint device installed from amongst a herd of cattle.

In accordance with the invention, a bull having the blocking device installed is used to detect estrus in one or more cows. The bull with the blocking device installed thereon is given access to the one or more cows and observation of the bull mounting a cow serves as an indication of estrus in the cow. The blocking device in accordance with the invention prevents the low grade bull on which it is installed from impregnating the cow and once estrus is detected in the cow, the cow may be artificially inseminated in accordance with conventional techniques.

The apparatus and method of this invention may be employed with other known devices for facilitating observation of the low grade bull mounting or attempting to mount a cow. That is, unless auxiliary means are used, it is necessary to observe the bull with the cows in order to determine whether the bull is mounting or attempting to mount one of the cows. There are known, however, devices for attachment under the chin or at the neck area of a bull which, when the bull mounts or attempts to mount a cow, causes a mark to be placed on the back of the cow so mounted. In this manner, the cows or cow being monitored can be observed once daily, for example, with the presence of a mark on any of the cows serving as an indication of the presence of estrus in the cows so marked.

Although this invention has been described with respect to particular preferred embodiments of the apparatus and method of the invention, it should be obvious that modifications may be made to the preferred embodiments particularly disclosed herein without departing from the true spirit and scope of the invention.

What is claimed is:

1. A method of detecting estrus in cows comprising the steps of inserting a blocking member in the sheath of a bull, securing the blocking member in place by means of a pin passing through the walls of the bull's sheath and the blocking member, and placing the bull with one or more cows, and detecting mounting of a cow by the bull as an indication of estrus in that cow.

2. A method of installing a tubular blocking tube having a transverse opening therein in the sheath of a bull comprising the steps of inserting the tubular blocking tube in the bull's sheath, manually locating one side of the transverse opening in the sheath by feeling the outside of the bull's sheath, making an incision in the wall of the sheath corresponding to the one side of the transverse opening, inserting a pointed rod through a hollow pin having one flanged end, flanged end first, inserting the pointed rod having the hollow pin contained thereon through the incision in the wall of the sheath and through the transverse opening in the tubular blocking tube so that the point of the pointed rod distends a portion of the opposite side of the sheath wall, making an additional incision in the opposite side of the sheath wall at the portion thereof distended by the pointed rod, sliding the hollow pin along the pointed rod so that its nonflanged end passes through the sheath wall incision, the transverse opening in the blocking member and the additional sheath wall incision, and installing a washer and a retaining device on the nonflanged end of the hollow pin whereby the pin is fixed to the sheath walls and the blocking tube is held in place by the pin.

* * * * *